United States Patent [19]

Makar

[11] 4,083,935
[45] Apr. 11, 1978

[54] SODIUM CYANIDE CRYSTALLIZATION PROCESS CONTROL

[75] Inventor: Kamel Michel Makar, Memphis, Tenn.

[73] Assignee: E. I. Du Pont de Nemours and Company, Wilmington, Del.

[21] Appl. No.: 800,064

[22] Filed: May 24, 1977

Related U.S. Application Data

[63] Continuation of Ser. No. 712,699, Aug. 9, 1976, abandoned, which is a continuation-in-part of Ser. No. 515,964, Oct. 18, 1974, abandoned.

[51] Int. Cl.² ............................................. C01C 3/10
[52] U.S. Cl. .................................................. 423/379

[58] Field of Search ................................. 423/371, 379

[56] References Cited

U.S. PATENT DOCUMENTS

| 2,993,754 | 7/1961 | Jenks et al. | 423/379 |
| 3,015,539 | 1/1962 | Snyder | 423/379 |
| 3,365,270 | 1/1968 | Guerin | 423/379 |

Primary Examiner—Earl C. Thomas

[57] ABSTRACT

Sodium hydroxide and hydrogen cyanide are reacted in aqueous solution to produce sodium cyanide of maximum crystal size at temperatures and with residence times selected to produce less than about 0.3% by weight sodium formate in the sodium cyanide product.

4 Claims, 3 Drawing Figures

SODIUM CYANIDE CRYSTALLIZATION PROCESS CONTROL

CROSS-REFERENCE TO RELATED APPLICATION

This application is a continuation of application Ser. No. 712,699, filed Aug. 9, 1976, and now abandoned, which is a continuation-in-part of application Ser. No. 515,964, filed Oct. 18, 1974, and now abandoned.

BACKGROUND OF THE INVENTION

This invention relates to a wet process for the production of sodium cyanide. More particularly, it relates to such a process in which the temperature and residence time are carefully controlled to obtain a maximum crystal size with an acceptable level of sodium formate.

Both dry and wet processes are known for producing sodium cyanide. In a well-known wet process, hydrogen cyanide vapor is neutralized with aqueous sodium hydroxide to produce a solution of sodium cyanide, which is then recovered by crystallization. Such processes and improvements in them have appeared frequently in the literature starting as long ago as U.S. Pat. No. 716,350 — Roessler (1902). Modern technology in wet process crystallization for production of sodium cyanide is discussed in U.S. Pat. No. 2,993,754 — Jenks and Linder (1961) which is incorporated herein by reference.

In this Jenks et al. patent, it is disclosed that sodium cyanide solutions can be produced with a slight excess of sodium hydroxide at reaction temperatures preferably between 60° and 70° C and possibly as high as 80° C. That patent also points out that sodium cyanide readily hydrolyzes in the presence of water to form hydrogen cyanide and sodium formate which can be substantially prevented by maintaining a sufficient excess of sodium hydroxide and avoiding solution temperatures above 70° C. It is said that the decomposition rate of sodium cyanide in such solutions at 80° C is at least seven times as great as at 60° C and that extremely close control of both concentration and temperature are necessary.

U.S. Pat. No. 3,615,176 — Jenks and Shannon (1971) describes a suitable commercial process for predensifying and then compacting anhydrous sodium cyanide crystals. Sodium cyanide having improved crystallinity and larger particle size would give better results with this process.

Producing larger crystals would be commercially beneficial because it would allow the filter cake to be dewatered faster and more completely, thus increasing the operating capacity of any particular sodium cyanide plant. Also, the operating conditions for handling the sodium cyanide would be improved due to reduced dust load in the system, and higher bulk density in the feed to the compacter would be desirable. Such improvements could substantially increase the production rate and also reduce plugging and unscheduled shutdowns. Furthermore, it is important to be able to control the production process at various rates of production so as to be able to obtain optimum crystallization with acceptable levels of sodium formate. It would be better to have larger crystal size, higher bulk density and lower moisture in the filter cake, all without increased sodium formate levels, than are available using published technology.

SUMMARY OF THE INVENTION

The present invention provides a control technique for a process of producing crystalline sodium cyanide containing no more than about 0.3% by weight sodium formate and with between about 35 and 60% of the crystals of sodium cyanide being in the range of 80 $\mu$ in cross section by contacting sodium hydroxide with hydrogen cyanide and crystallizing said sodium cyanide in an aqueous solution containing an excess of about 0.2% to 3.0% by weight of sodium hydroxide over the stoichiometric amount needed for reaction with the hydrogen cyanide, said control technique comprising maintaining said aqueous solution during said contacting and said crystallizing within a temperature range indicated for the residence time of sodium cyanide in solution between curves A and B of FIG. 3 of the drawing.

Preferably, with a residence time of sodium cyanide in solution of about 1.3 hours, the temperature of the contacting is about 72° to 75° C. and between 40% and 60% of the crystals produced are larger than 80 $\mu$ in cross section.

With a residence time of sodium cyanide in solution of about 1.8 hours, the temperature should be in the range of 69.5° to 72.5° C.

Percentages and proportions herein are by weight except where indicated otherwise. Particle sizes are determined by numerical count on a sample using optical microscopy.

DETAILED DESCRIPTION

Figure 3:
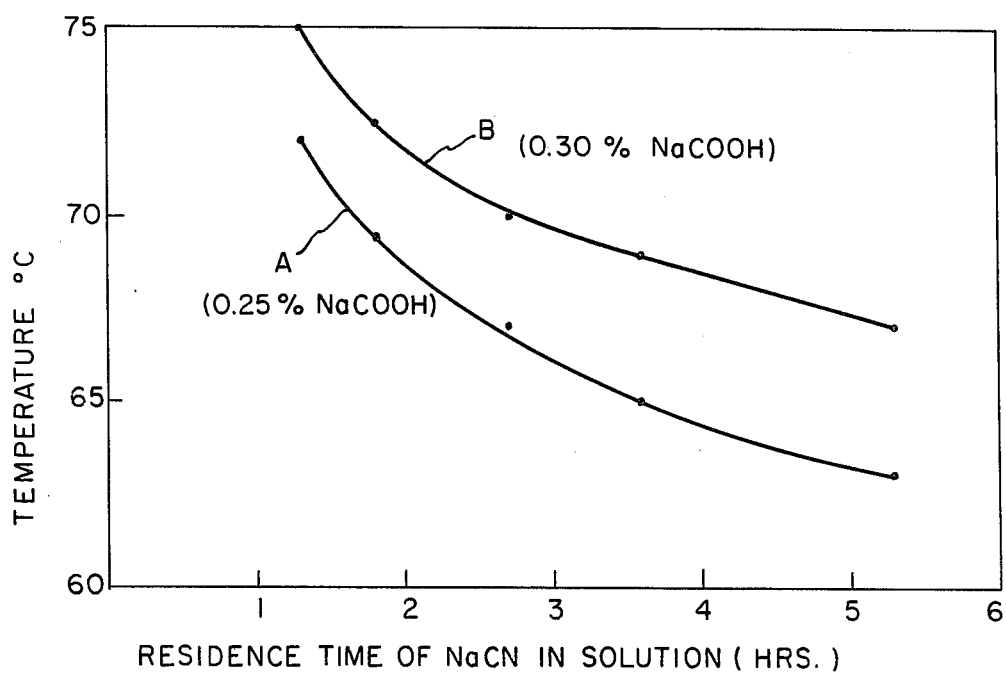
FIG. 3 is a graph showing the relationship of crystallizing temperature to residence time of sodium cyanide in solution to obtain about 0.25% sodium formate, curve A, and 0.30% sodium formate, curve B, in the resulting sodium cyanide product.

Contrary to the observation in Jenks et al., U.S. Pat. No. 2,993,754 that temperatures above 70° C are deleterious to the formation of sodium cyanide crystals in a wet process because of the rate of decomposition of sodium cyanide, the present invention involves the recognition that various temperatures, including those in the range of 72° to 75° C, can be used to achieve a maximum size of sodium cyanide crystals, maximum bulk density, and minimum moisture in the filter cake of the crystals after separation from the reaction media, so long as the temperature is closely controlled in relation to the residence time of sodium cyanide in solution within curves A and B of FIG. 3. This is achieved with no more than about 0.3% sodium formate in the sodium cyanide product.

Thus, the present invention can be characterized mainly as a control technique.

Crystal size does not continue to increase with increased temperature at a particular residence time. For instance, with a residence time of 1.8 hours a maximum crystal size is reached in the range of 70° to 75° C. It is thought that a possible mechanism for this behavior may be interference with crystal growth by increasing quantities of sodium formate. Thus, as the content of sodium formate in the sodium cyanide product increases above about 0.3%, the resulting size of sodium cyanide crystals decreases. There is a concomittant decrease in bulk density and increase in filter cake moisture content upon dewatering the sodium cyanide product on a vacuum filter.

With reference to Jenks et al., U.S. Pat. No. 2,993,754, the present invention utilizes the same equipment and processes as discussed by Jenks et al. The difference is that the temperature in the evaporator-crystallizer is controlled in relationship to the residence time of sodium cyanide in solution to obtain product with less than 0.3% sodium formate. To optimize the process, conditions are used which produce between 0.25 and 0.3% sodium formate between curves A and B of FIG. 3. The means of temperature control used by Jenks et al. is desirable, namely, by controlling the pressure in the evaporator-crystallizer. A pressure of 90 millimeters of mercury causes the solution to boil at about 72° C. Adequate heat to maintain boiling is provided through the heat of reaction and by adding heat to recirculating liquid, as described by Jenks et al.

Crystallization of salts in general and particularly of sodium cyanide are governed by complex and competing mechanisms, both chemical and physical in nature. These often make it impossible to predict the results of making significant changes in industrial processes. Included among the competing mechanisms are supersaturation, various chemical reactions, crystal growth and attrition, residence time in solution and as crystals, and impurities.

Supersaturation is generally the most important aspect affecting crystal formation. The supersaturation or supersolubility of a solution is the amount of solute which can be dissolved in excess of the solubility at a given temperature before large numbers of very small or submicron crystals form spontaneously. The supersolubility is regarded as being a curve approximately parallel to the solubility curve. In an industrial evaporative sodium cyanide crystallizer, external circulation of the NaCN liquor thru a stream calandria provides the necessary heat input to evaporate water. The dynamics of the system are such that as water is evaporated supersaturation occurs prior to crystal formation. The greater the supersaturation, the longer the "delay" in precipitation of crystals. The precipitation of crystals occurs in two distinct paths, crystal growth to large crystals with low surface area per unit weight and nucleation to very small submicron crystals. The rate of crystal growth increases linearly with supersaturation, but the rate of nucleation increases exponentially with supersaturation. The result of this imbalance of rates is that crystal size decreases rapidly as the saturation approaches a critical value, called the supersolubility limit. Most favorable conditions for minimum supersaturation exist when temperature differentials throughout the crystallization system are at a minimum.

Chemical reactions play an important role. Theoretically the crystallizer is designed as a piece of process equipment to produce crystals of sodium cyanide that can be separated from the solution by filtration. The resulting filtrate or "mother liquor" is recycled to the crystallizer. In actual practice, one or more chemical side reactions also take place in the system. The extent of new compound formation depends on many factors including temperature, ingredient concentrations, pH, residence times, pressure, catalytic action and synergism.

Some of the side reactions that take place in the sodium cyanide crystallizer system are as follows:

1. $NaCn + H_2O \rightarrow NaCOOH + NH_3$
2. $CO_2 + 2NaOH \rightarrow Na_2CO_3 + H_2O$
3. $H_2SO_4 + 2NaOH \rightarrow Na_2SO_4 + 2H_2O$
4. $SO_2 + 2NaOH \rightarrow Na_2SO_3 + H_2O$ Such new compounds can inhibit or conversely enhance the pattern and size of cubic sodium cyanide crystals. It is well known that sodium formate, NaCOOH, inhibits the size of NaCN crystals. The effect of $Na_2CO_3$, $Na_2SO_4$ and $Na_2SO_3$ are not as well known. All indications, however, are that their effect is small. The concentrations of these three compounds are rather constant since the formation reactions 2., 3., and 4. above are fast and go to completion regardless of crystallizer residence time.

Sodium formate formation continues during the entire time since NaCN and $H_2O$ are always present. Therefore, there is a critical balance between time and temperature. Longer residence times and higher temperatures increase the equilibrium concentration of sodium formate in the crystallizer liquor. The ideal situation is where crystals continue to grow larger, and where nucleation of small crystals, agglomeration of crystals and formation of deleterious compounds are minimal. The present invention involves the discovery of a very narrow range of relatively high temperatures where an optimal balance was struck between high temperatures favoring crystal growth and allowing permissible sodium formate formation, below 0.3%.

Circulation of the slurry containing the crystals is necessary for adequate mixing, for reaction rate of NaOH and HCN and for transfer of the required heat input. A low-impact pump should be used to circulate the slurry through an external steam calandria system. The tangential reentry at the crystallizer provides sufficient agitation due to the cyclonic effect.

Excessive mechanical action, either crystal against crystal or crystal against metal, can cause breakage or attrition of the large crystals. The phenomenon usually involves a cleavage of the corners rather than mid transcrystal separation. However, the effect can be rather detrimental since the corner pieces are very small with high surface to volume ratio. Similtaneously the crystal with its now rounded corners also has lower surface to volume ratio. Since a filtrate film coating the crystals will be nearly uniform in thickness, surface area will ultimately control production rate, process operating continuity, fouling problems and final produce quality.

A counter effect of attrition can be advantageous however. As mentioned previously, agglomerations of crystals form masses that are difficult to dewater during filtration. Mechanical attrition has the effect of breaking apart the agglomerated masses. While this is a desirable result, its effect is normally overshadowed by the deleterious effect of crystal attrition.

Residence time has an important impact on the growth of sodium cyanide crystals. The crystallizer system contains a saturated solution of sodium cyanide (about 45% NaCN). There are also fractional percentages of sodium formate, sodium carbonate, sodium sulfate and sodium sulfite. A suspension of precipitated sodium cyanide crystals (about 7%) is maintained in the solution. For purposes of understanding the mechanisms, two types of residence times are considered. The residence time of NaCN in solution and the residence time of NaCN crystals in the reactor are both determined by the average length of time between their introduction into or formation in the reactor and their consumption or removal from the reactor. In a continuous system, these times are determined by the rates of supply to and removal from the system of chemicals and crystals.

The residence time of NaCN crystals with the present invention is relatively short, usually about one-sixth of the residence time of the NaCN in solution. A certain minimum residence time is required for growth of crystals. In the case of NaCN it is rather short; about 0.2 hours. Longer residence times while favoring growth, can be detrimental in the special case of NaCN since agglomeration of crystal masses retain water or mother liquor in the interstices, greatly inhibiting the dewatering action in subsequent filtration. A compromise must be made in order to consistently produce large single crystals that are so important to high production rate and high product quality. Presence of impurities and other environmental effects inside the crystallizer make predictive control of proper residence time difficult. Crystal residence times over one hour are generally detrimental in the present invention.

The residence time of NaCN in solution involves the effect of time on chemical reactions rather than the physical effects of crystal growth and agglomeration discussed above. The reaction of NaCN + $H_2O$ → NaCOOH + $NH_3$ is primarily time and temperature controlled. Since sodium formate is inhibiting and detrimental to sodium cyanide crystal growth, shorter residence times are desired. However, as the operating or production rate is reduced the residence time lengthens and increased sodium formate results. This dictates a downward adjustment in the operating temperature level. The residence time of NaCN in solution is used as an indicia of the present invention.

Industrial crystallization is far more difficult and less predictive than laboratory crystallization primarily because of the presence of impurities. In the laboratory, pure water and raw materials can be used in glass equipment. In the industrial plant, impurities enter the system with the water, the raw materials and corrosion of process equipment.

The end effect of impurities is slower crystal growth and small crystals, making the adjustment of industrial processes an empirical and largely unpredictable art.

With all of these factors influencing the crystallization of sodium cyanide, the discovery of useful control techniques is a valuable contribution to the art. It is apparent from the above that discovery of optimum conditions at design production rate is inventive and unique. The diverse variables have the effect of hiding and making discovery extremely elusive. A change in production rate, tantamount to simultaneous changes in residence times of crystals and solution, attrition rate, etc. compounds the elusiveness of the optimum settings. However, these optimum conditions have now been determined and quantified in Table I. These data have been extrapolated to provide the limiting curves A and B of FIG. 3.

TABLE I

SODIUM CYANIDE CRYSTALLIZATION TEMPERATURE-RESIDENCE TIME VERSUS SODIUM FORMATE IMPURITY IN PRODUCT

| Sample | Residence Time-Hours | | Temp. °C | NaCOOH Content of Product-% Wt |
|---|---|---|---|---|
| | NaCH Crystals | NaCN in Solution | | |
| 1 | 0.73 | 5.3 | 57 | 0.17 |
| 2 | 0.73 | 5.3 | 62 | 0.23 |
| 3 | 0.73 | 5.3 | 64 | 0.26 |
| 4 | 0.73 | 5.3 | 67 | 0.30 |
| 5 | 0.73 | 5.3 | 72 | 0.55 |
| 6 | 0.48 | 3.6 | 59 | 0.19 |
| 7 | 0.48 | 3.6 | 64 | 0.24 |
| 8 | 0.48 | 3.6 | 66 | 0.26 |
| 9 | 0.48 | 3.6 | 69 | 0.30 |
| 10 | 0.48 | 3.6 | 74 | 0.56 |
| 11 | 0.36 | 2.7 | 61 | 0.19 |
| 12 | 0.36 | 2.7 | 66 | 0.25 |
| 13 | 0.36 | 2.7 | 68 | 0.27 |
| 14 | 0.36 | 2.7 | 71 | 0.31 |
| 15 | 0.36 | 2.7 | 76 | 0.57 |
| 16 | 0.24 | 1.8 | 62 | 0.19 |
| 17 | 0.24 | 1.8 | 67 | 0.22 |
| 18 | 0.24 | 1.8 | 69 | 0.24 |
| 19 | 0.24 | 1.8 | 72 | 0.29 |
| 20 | 0.24 | 1.8 | 77 | 0.53 |
| 21 | 0.18 | 1.3 | 65 | 0.18 |
| 22 | 0.18 | 1.3 | 70 | 0.23 |
| 23 | 0.18 | 1.3 | 72 | 0.25 |
| 24 | 0.18 | 1.3 | 75 | 0.30 |
| 25 | 0.18 | 1.3 | 80 | 0.55 |

The example of Jenks et al. was repeated with a residence time of sodium cyanide in solution of 1.8 hours.

The evaporator-crystallizer temperature was controlled at several levels between 65° and 80° C. The results of these trials are given in Table II below, showing the temperature, the sodium formate concentration in the sodium cyanide crystals, the bulk density of the dried crystals, the crystal size in terms of the percent of crystals larger than 80 microns by numerical count, and the percent moisture in filter cake.

Although higher levels of sodium formate are undesirable, 0.3% sodium formate can generally be tolerated in a commercial sodium cyanide.

TABLE II

RESULTS OF TEMPERATURE VARIATION

| Ex. | Temp. °C. | NaCOOH (%) | Bulk Density (lbs. /cu. ft. | Crystal Size (% > 80µ) | Filter Cake Moisture (%) |
|---|---|---|---|---|---|
| 1 | 65 | 0.18 | 32 | 5 | 10 |
| 2 | 70 | 0.23 | 39.6 | 40 | 6 |
| 3 | 72 | 0.25 | 40 | 45 | 5.5 |
| 4 | 75 | 0.30 | 39 | 40 | 6 |
| 5 | 80 | 0.55 | 30 | 0 | 12 |

Figure 1:
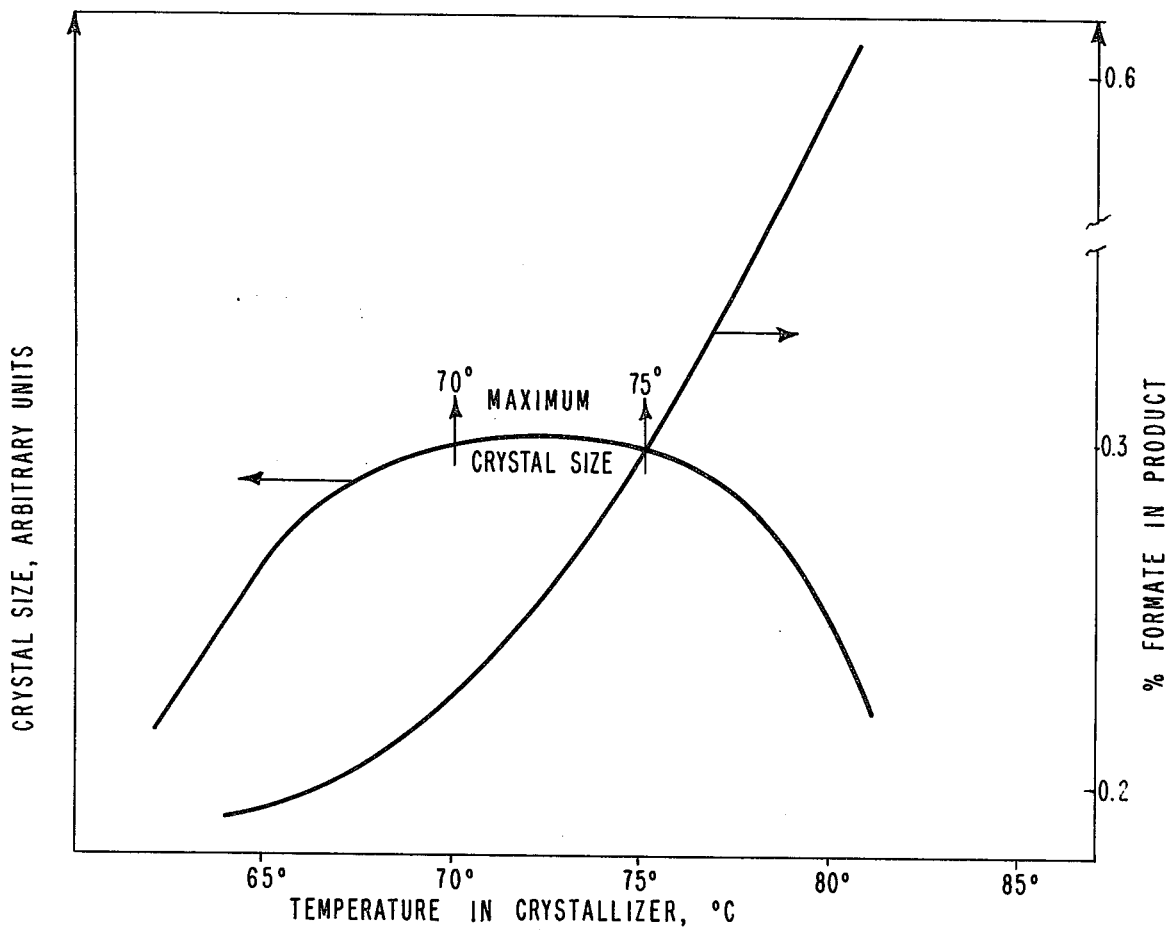
FIG. 1 is a graph showing the effect of crystallization temperature on crystal size and sodium formate level.
Figure 2:
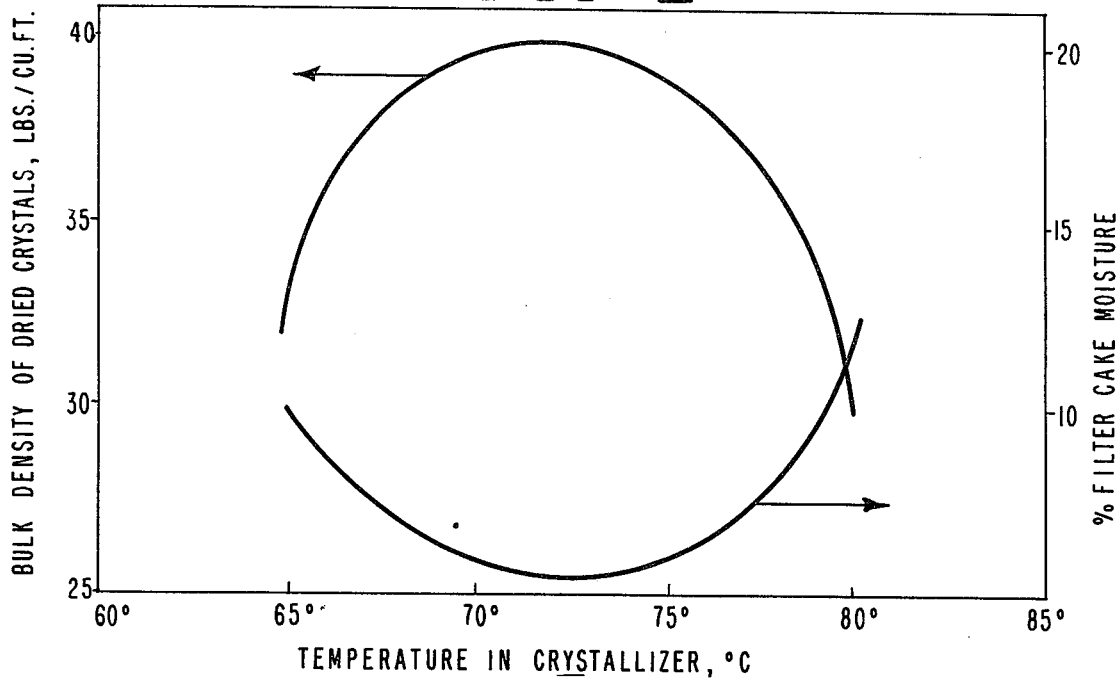
FIG. 2 is a graph showing the effect of crystallization temperature on bulk density and percent moisture in the filter cake.

The type of data presented in Table II is also present in FIGS. 1 and 2 to illustrate graphically the effects of temperature in obtaining the desired maximum crystal size and bulk density, and the desired minimum amount of water in the filter cake.

What is claimed is:

1. A control technique for a process of producing crystalline sodium cyanide containing no more than about 0.3% by weight sodium formate and with between about 35 and 60% of the crystals of sodium cyanide being larger than 80 µ in cross section by contacting sodium hydroxide with hydrogen cyanide and crystallizing said sodium cyanide in an aqueous solution containing an excess of about 0.2% to 3.0% by weight of sodium hydroxide over the stoichiometric amount needed for reaction with the hydrogen cyanide, said contacting and crystallizing taking place at subatmospheric pressures, said control technique comprising maintaining said aqueous solution during said contacting and said crystallizing within a temperature range indicated for the residence time of sodium cyanide in solution between curves A and B of FIG. 3 of the drawing.

2. A process for producing crystalline sodium cyanide containing no more than about 0.3% by weight sodium formate and with between about 35% and 60% of the crystals of sodium cyanide being larger than 80 μ in cross section, said process comprising contacting sodium hydroxide with hydrogen cyanide and crystallizing said sodium cyanide in an aqueous solution containing an excess of about 0.2% to 3.0% by weight of sodium hydroxide over the stoichiometric amount needed for reaction with the hydrogen cyanide, said contacting and crystallizing taking place at subatmospheric pressures and at temperatures in the range of 72° to 75° C, with a residence time of sodium cyanide in solution of about 1.3 hours.

3. The process of claim 2 in which the temperature of said contacting and crystallizing is about 72° C and in which from 40% to 60% of the sodium cyanide crystals produced are larger than 80 μ in cross section.

4. A process for producing crystalline sodium cyanide containing no more than about 0.3% by weight sodium formate and with between about 35% and 60% of the crystals of sodium cyanide being larger than 80 μ in cross section, said process comprising contacting sodium hydroxide with hydrogen cyanide and crystallizing said sodium cyanide in an aqueous solution containing an excess of about 0.2% to 3.0% by weight of sodium hydroxide over the stoichiometric amount needed for reaction with the hydrogen cyanide, said contacting and crystallizing taking place at subatmospheric pressures and at temperatures in the range of 69.5° to 72.5° C with a residence time of sodium cyanide in solution of about 1.8 hours.

* * * * *